United States Patent [19]

Kata

[11] Patent Number: 5,340,294
[45] Date of Patent: Aug. 23, 1994

[54] CIRCUMFERENTIALLY ALIGNED DETACHABLE SEGMENTED CURING MOLD FOR PNEUMATIC TIRES AND METHOD OF MANUFACTURING SAME

[75] Inventor: Takehiro Kata, Kodaira, Japan

[73] Assignee: Bridgestone Corporation, Tokyo, Japan

[21] Appl. No.: 911,585

[22] Filed: Jul. 10, 1992

[30] Foreign Application Priority Data

Jul. 15, 1991 [JP] Japan .................... 3-198350

[51] Int. Cl.⁵ .................. B29C 35/00; B29C 33/38
[52] U.S. Cl. ........................ 425/32; 29/447; 264/219; 425/46; 425/195
[58] Field of Search .............. 425/32, 46, 47, 179, 425/193, 195, 183; 249/102; 264/219; 29/447, 525

[56] References Cited

U.S. PATENT DOCUMENTS

| | | | |
|---|---|---|---|
| 3,341,933 | 9/1967 | McPhadin et al. | 425/46 |
| 3,697,211 | 10/1972 | Chisholm | 29/447 |
| 4,553,918 | 11/1985 | Yoda et al. | 425/46 |
| 4,708,609 | 11/1987 | Yoda et al. | 425/195 |

FOREIGN PATENT DOCUMENTS

| | | |
|---|---|---|
| 0451832 | 10/1991 | European Pat. Off. . |
| 1575605 | 3/1968 | France . |
| 2541624 | 2/1984 | France . |
| 60-198210 | 10/1985 | Japan .................... 425/195 |
| 151324 | 11/1989 | Japan . |

*Primary Examiner*—Jay H. Woo
*Assistant Examiner*—Robert B. David
*Attorney, Agent, or Firm*—Sughrue, Mion, Zinn, Macpeak & Seas

[57] ABSTRACT

A curing mold for pneumatic tires includes a plurality of segments which are detachably adjoined with each other in a direction corresponding to circumferential direction of a product tire. Each segment has a plurality of fitting pieces with fixing portions at both ends at least one which is complementary to part of the land portion of the tire. The fitting pieces are secured to and supported by a supporting block having an inner surface which is complementary to the land and groove portions of the tire, which is formed with fitting grooves for engaging the fixing portions of the fitting pieces therein.

5 Claims, 4 Drawing Sheets

FIG_1A
PRIOR ART
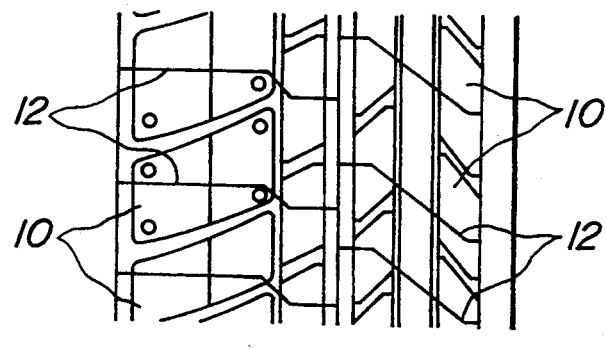
FIG_1B
PRIOR ART
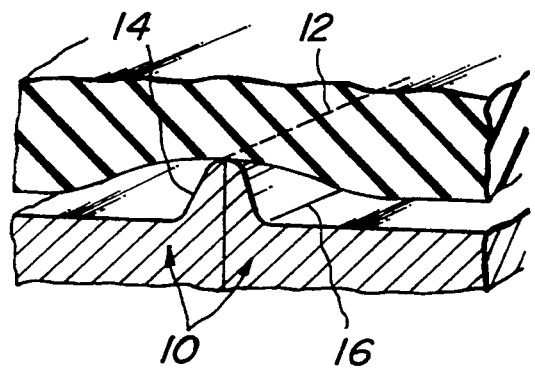

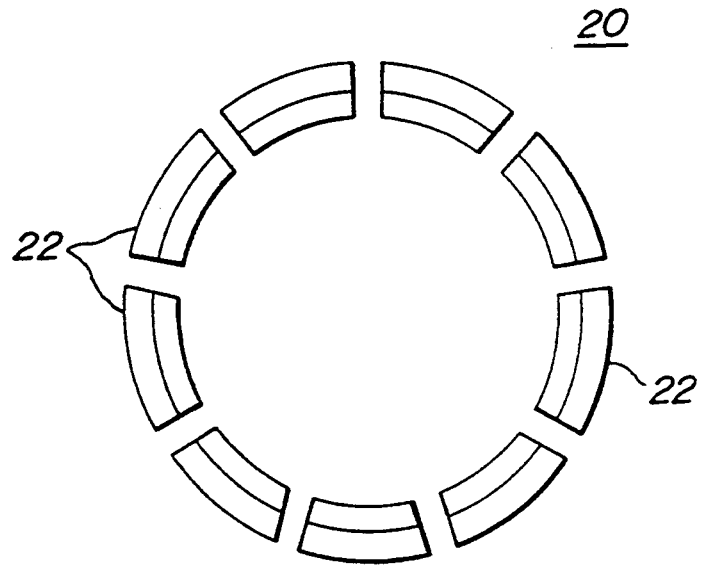
FIG_2A
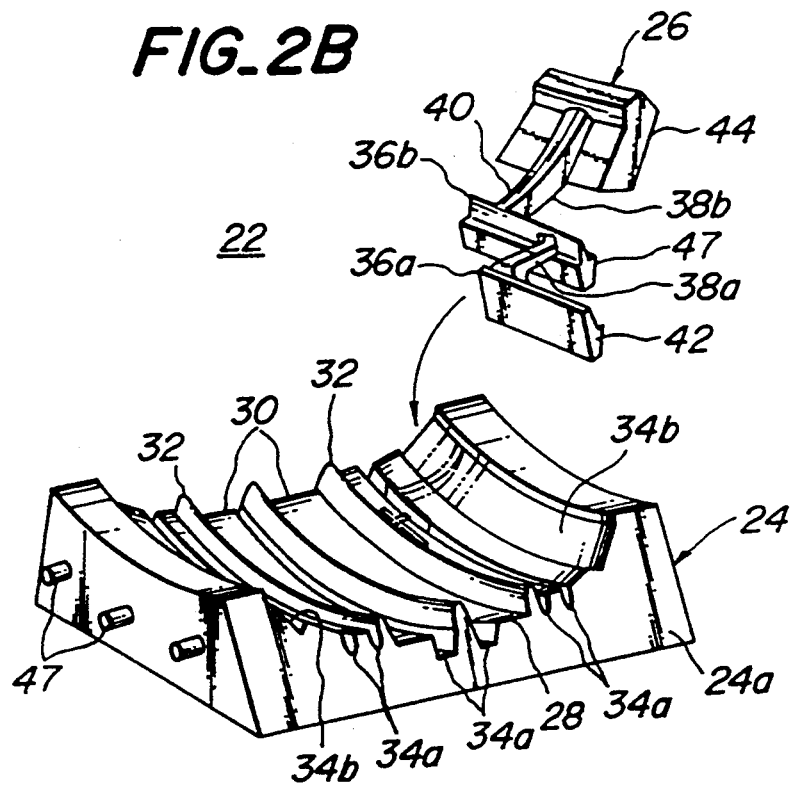
FIG_2B

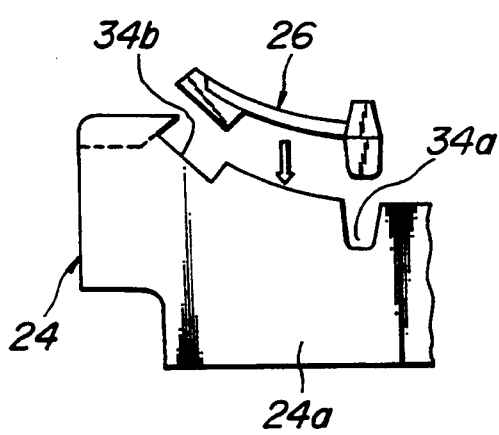
FIG_3A
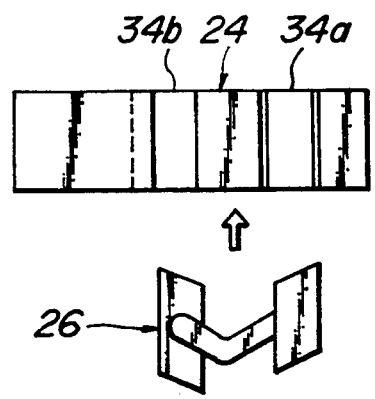
FIG_3B
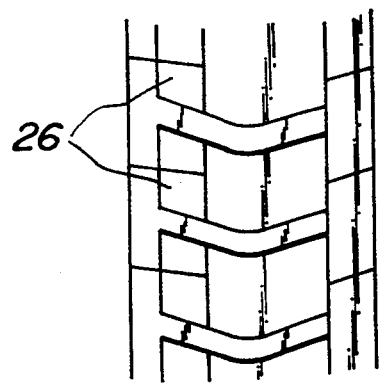
FIG_3C

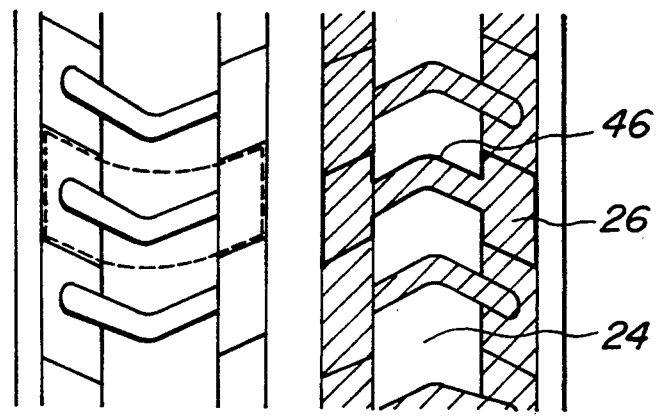
FIG_4

CIRCUMFERENTIALLY ALIGNED DETACHABLE SEGMENTED CURING MOLD FOR PNEUMATIC TIRES AND METHOD OF MANUFACTURING SAME

BACKGROUND OF THE INVENTION

1. Field of the Invention

The present invention relates to a curing mold for vulcanizing green tires and thereby manufacturing pneumatic tires.

2. Description of Related Art

Conventionally, various types of curing molds for manufacturing pneumatic tires are known. For example, a so-called insert segment type curing mold includes a plurality of fitting pieces each having an inner surface with concave or convex portions corresponding to land or groove portions of a product tire at least in its tread portion. A set of fitting pieces is mutually adjoined with each other and secured to a supporting member to form a segment, and a set of segments is mutually adjoined with each other into an annular assembly with a predetermined inner surface configuration.

It is generally necessary during the vulcanization process to tightly urge a green tire against the inner surface of the mold by means of an expansible bladder. Thus, air within a space between the outer surface of the green tire and the inner surface of the mold has to be discharged via boundary portions 12 between adjacent fitting pieces 10, 10, as shown in FIG. 1A. On this occasion, part of non-vulcanized rubber tends to be extruded from the mold along the boundary portions 12. Consequently, the insert segment type curing mold suffers from a problem that undesirable burrs tend to be formed at the land portion of the product tire inclusive of the ground contact portion. Such burrs protrude radially outwardly of the product tire and significantly deteriorate the appearance of the tire.

For preventing formation of burrs at the land portion of the product tire, one possible solution may be to arrange the boundary portion 12 of the adjacent fitting pieces 10 at a location corresponding to a groove portion of the product tire or to a protrusion 14 on the inner surface of the mold, as shown in FIG. 1B. However, such a structure makes it difficult to properly discharge air from the inside space of the mold. Rather, air tends to remain at a portion of the mold space which corresponds to the junction of a land portion and an adjacent groove portion of the product tire. The residual air within the mold often forms so-called "sags" and "bubbles" along the edge of the land portion of the product tire, and significantly deteriorates the appearance of the tire.

For overcoming the abovementioned drawbacks, another type of curing mold is known such as a "backbone" type mold which is disclosed, for example, in Japanese Patent Examined Publication No. 1-51,324. This type of curing mold includes an annular mold main body with a basic inner surface configuration corresponding to the land portion of a product tire in at least a tread portion thereof, and a plurality of projections corresponding to the groove portions of the product tire which are detachably secured to the main body for realizing a mold of a desired inner surface configuration.

Such an arrangement of a "backbone" type curing mold proved to be advantageous in that air within the mold can be discharged from the gap between the main body and the projections, corresponding to the edge of the land portion of a product tire, without forming burrs at the ground contacting portion of the product tire. However, this type of curing mold suffers from different disadvantages as follows. At the outset the, fastening operation for securing the projections to the mold main body with a number of bolts or the like is time-consuming and troublesome. It is also difficult to uniformly and accurately secure the projections to the mold main body for improving the product quality in terms of uniformity and accuracy. Moreover, for ensuring a stable discharge of air from the mold through the gap between the mold main body and the projections, it is necessary to periodically separate the projections from the mold main body so that not only the assembly of the curing mold, but also its maintenance is troublesome.

Apart from the above, there may be instances wherein it is desirable to modify the existing curing mold in view of minor changes in design of the tread pattern. However, known curing molds are not always suitable for such modification, and it has been a general practice to prepare entirely new molds for respective tread patterns even in the case of minor changes.

SUMMARY OF THE INVENTION

The present invention has been conceived by taking the abovementioned problems into consideration, and it is an object of the present invention to provide a novel curing mold which makes it possible to realize an excellent appearance and improved accuracy and uniformity of product tires, and to readily respond to change in tire design and facilitate maintenance of the mold.

In order to achieve the abovementioned object, according to one aspect of the present invention, there is provided a curing mold for pneumatic tires, comprising a plurality of segments which are detachably aligned with each other in a direction of the mold corresponding to a circumferential direction of a product tire. Each segment has an inner circumferential surface portion which is complementary in shape-to land and groove portions in a tread region of the tire. Each segment comprises a plurality of fitting pieces and a supporting block for supporting the fitting pieces so as to form a part of the inner circumferential surface portion. Each of the fitting pieces comprises a projection which is complementary in shape to a part of the groove portion. Both ends of the fitting piece are fixing portions at the inner circumferential surface portion of the segment, for fixedly securing the fitting piece to the supporting block. At least one of the fixing portions is complementary in shape to part of the land portion. Each supporting block has fitting grooves corresponding to the fixing portions of the fitting pieces. The fixing portions of each fitting piece is engaged in the fitting grooves of the block.

Preferably, each fitting piece is formed of a material having a thermal expansion coefficient which is higher than that of a material forming the supporting block.

According to another aspect of the present invention, there is provided a method of manufacturing a curing mold for pneumatic tires, comprising a plurality of segments which are detachably aligned with each other in a direction of the mold corresponding to a circumferential direction of a product tire, each segment having an inner circumferential surface portion which is complementary in shape to land and groove portions in a tread region of the tire, wherein the method comprises the steps of preparing a plurality of fitting pieces, each having a projection which is complementary in shape to part of the groove portion of the tire and fixing portions at both ends of the projection, at least one of which is complementary in shape to part of the land portion of the tire, preparing a supporting block having fitting grooves corresponding to the fixing portions of the fitting pieces in that side of the supporting block which forms part of the inner circumferential surface portion of the mold, and successively securing the fitting pieces to the supporting block by engaging the fixing portions of the fitting pieces into the fitting grooves of the supporting block, so as to form the segment.

According to the present invention, each fitting piece of the curing mold can be fixedly secured to the supporting block by engaging the fixing portion at both ends into the fitting grooves of the supporting block. Thus, the fitting pieces can be fixedly secured to the supporting block without fastening means as required in the abovementioned prior art. In addition, it is possible to increase the length of the boundary portion of the projection including the periphery of the fixing portion and the block, that is the length of the portion effective for the discharge of air in the space defined by and between the mold and the green tire, so that it is possible to positively discharge the air from the inside space of the mold in a reliable manner. Furthermore, each fitting piece (except for the fixing portion) is opposed to the supporting block with the surface which is arranged substantially in a region of the mold corresponding to the tread region of the product tire. A sufficient amount of non-vulcanized rubber can thus be filled into that portion of the mold which corresponds to the edge at the land portion of the product tire. This means that air is prevented from remaining in such a mold portion as was the case in the prior art, so that neither bubbles nor sags are generated in the corresponding portion of the product tire.

Moreover, even when burrs are formed due to a possible extrusion of non-vulcanized rubber from the boundary portion of the mold, the burrs are formed to extend approximately within a plane including the tread region of the product tire, namely in the groove portion of the tire. Thus, the appearance of the product tire in its tread region is less deteriorated as compared with the prior art tire in which burrs are formed to protrude radially outwardly from the tread region of the tire. Since, furthermore, the portion of the mold corresponding to the tread region of the product tire is directly formed by the supporting blocks having the inner surface shape corresponding to the tread region, it is possible to improve the uniformity of the mold in the circumferential direction by assembling the blocks in an annular arrangement and subjecting their inner surfaces to machining into an substantially regular circle, with a lathe, for example.

BRIEF DESCRIPTION OF THE DRAWINGS

The present invention will now be described hereinafter in greater detail with reference to the accompanying drawings, in which:

FIGS. 1A and 1B are explanatory views showing the conventional curing mold as explained above, which is used to vulcanize a green tire for manufacturing a pneumatic tire;

FIG. 2A is an explanatory view showing the curing mold according to the present invention including a plurality of segments;

FIG. 2B is a perspective view showing the segment in an enlarged scale;

FIGS. 3A to 3C are explanatory views showing the manner of assembly of the fitting pieces to the block; and FIG. 4 is an explanatory view showing the boundary portion of the segments.

DETAILED DESCRIPTION OF THE PREFERRED EMBODIMENTS

There is shown in FIG. 2A one preferred embodiment of the curing mold according to the present invention, which is designated as a whole by reference numeral 20. For allowing a vulcanization of a green tire, the mold 20 has an inner surface configuration corresponding to land and groove portions of a product tire at least in a tread portion thereof. The mold 20 is composed of a plurality of segments 22 which are aligned and connected with each other in the circumferential direction of the mold into an annular configuration. Each segment 22 has pegs 47.

As clearly shown in FIG. 2B, each segment 22 is provided with a supporting block 24 and a plurality of fitting pieces 26 secured to the block 24. These supporting blocks 24 and fitting pieces 26 cooperate with each other to form the inner circumferential surface portion of the mold 20 which is complementary in shape to the land and groove portions of the product tire in its tread portion. While FIG. 2B shows only one fitting piece 26, this is merely for the sake of simplicity. As a matter of fact, one supporting block 24 is usually combined with a plurality of fitting pieces 26, e.g., seven or eight in number.

The block 24 has an inside portion 28 forming part of the inner circumferential surface of the mold which is complementary to the tread portion of the product tire. The inside portion 28 is formed with a plurality of concave portions 30 which are complementary to the land portions at the ground contacting portion of the product tire. In the embodiment illustrated, the concave portions 30 extend in the circumferential direction of the mold 20 to form circumferential land portions of the tire. Furthermore, the inside portion 28 of the block 24 has regions 32 corresponding to a tread center region of the product tire and its shoulder portions. These regions of the block 24 are formed with fitting grooves 34a, 34b to extend in the circumferential direction of the mold 20, respectively, so as to form further circumferential land portions of the tire.

Each fitting piece 26 cooperates with the block 24 to form an inner circumferential surface portion of the mold which is complementary to the tread portion of the product tire. In the illustrated embodiment, the inner surface of the fitting piece 26 is provided with ridges 36a, 36b which correspond to circumferential grooves of the tire, and further ridges 38a, 38b which, in turn, correspond to lateral grooves of the tire intersecting with the circumferential grooves. These ridges 36a, 36b, 38a, 38b jointly constitute an integral projection 40 which is a groove forming element of each segment 22. Both ends of the projection 40 are spaced in the width direction of the mold 20, and provided with fixing portions 42, 44 which are to be engaged into the fitting grooves 34a, 34b in the block 24, respectively. Engagement of the fixing portions 42, 44 with the respective fitting grooves 34a, 34b ensures the fitting piece 26 to be integrally secured to the block 24. In the present embodiment, for more stably securing the fitting piece 26 to the block 24, a further fixing portion 48 is provided for the projection 36b which is situated at an intermediate position between the both end fixing portions 42 and 44.

As schematically shown in FIG. 3A and 3B, the fitting grooves 34a, 34b of the block 24 are configured such that the groove 34a has a side wall on the side of the tread center region of the product tire, which is opposed to a side wall of the groove 34b on the side of the side wall region of the tire. These side walls of the grooves 34a, 34b are spaced from each other by a predetermined distance which increases radially outwardly of the mold 20 as seen in a radial cross-section of the product tire. Such a configuration of the grooves 34a, 34b permits the fitting pieces 26 to be successively fitted to the segment 22 from the side of the connecting surface 24a of the segment 22, as shown in FIG. 3B, and to prevent undesired radial movement or play of the fitting pieces 26 already fitted to the block 24.

Due to the provision of the fixing portions at the end portions, the projection 40 can be more positively secured to the block 24 as compared with the conventional arrangement wherein the projection 40 has an external form corresponding to the groove portions of the product tire and is directly secured to the block 24. At least one of the fixing portions 42, 44 is of a complementary shape with respect to the land portion of the product tire. This, in the present embodiment, is the case for the fixing portion 44 on the side of the shoulder region of the product tire. With such an arrangement, the junction between the fitting piece 26 and the block 24 can be situated at a location where undesired bubbles and sag would otherwise tend to be generated during vulcanization of the tire. In other words, air within the mold 20 can be discharged from the mold 20 in a reliable manner, without generating bubbles and sag.

The projection 40 of the fitting piece 26 may have a fixing portion in the tread center region of the product tire, which is of a complementary shape with respect to the land portion of the tire, if necessary. Also, the fixing portions at both ends of the projection 40 may be of a similar complementary shape.

The fitting pieces 26 may be secured to the block 24 in various ways, and the manner of securing the fitting pieces is not limited to that as in the abovementioned embodiment. As represented by broken lines in FIG. 3A–3C, for example, the block 24 of a segment 22 may include a separable wall portion in which the fitting groove 34b is formed. In this case, the fixing portions, 44 of the fitting piece 26 can be engaged into the relevant fitting grooves, 34b, with the wall portion separated from the block 24. The wall portion can then be integrally secured to the block 24 together with the fitting piece 26. By securing a plurality of fitting pieces 26 to the block 24 in this way, a segment 22 can be obtained which is partly shown in FIG. 3C and also indicated by hatch lines in FIG. 4.

In the case of such a segment 22, a boundary portion 46 is formed along the edge of each fitting piece 26 secured to the block 24 of the segment 22, as schematically shown with a bold solid line. On the contrary, in the conventional curing mold such as that shown in FIGS. 1A and 1B, the boundary portion is formed between adjacent fitting pieces as shown in FIG. 3 by broken lines. This is because the prior art fitting piece, whose inner surface portion is complementary to the land and groove portions in the tread region of the product tire, is adjoined to a neighboring fitting piece for completing the entire mold inner surface.

Such boundary portions function as passages for discharging air within a space between the mold and the green tire. A larger cross-sectional area or a longer peripheral length of the discharge passage serves to more effectively discharge air from the mold. In this connection, the boundary portion 46 of the curing mold according to the present invention, as shown by the bold solid line in FIG. 4, is much longer than that of the conventional one shown by the broken line.

Furthermore, in the conventional curing mold, the boundary portion shown by the broken line is positioned in the entire area of the mold region corresponding to the tread region of the product tire, so that outwardly protruding burrs tend to be formed on the tread region of the product tire to significantly deteriorate its appearance. On the contrary, according to the present invention, a substantial portion of the tread region is directly formed by the block 24 of a complementary shape, making it possible to prevent or at least minimize formation of burrs in the tread region of the product tire.

Further, the segment 22 of the curing mold according to the present invention is composed of the blocks 24 each defining the inner surface shape of the mold except for the projection 40 inclusive of the fixing portions, and having the complementary shape with respect to the tread region of the product tire. It is thus possible to improve the out-of-roundness in the tread region of the product tire.

Both end fixing portions of the projection 40 are secured into the fitting grooves of the block 24 of the shape which corresponds to the outer shape of the tire to be molded. Further, the ridges 38a, 38b of the projection 40 are supported by the block 24 which is complementary to the outer shape of the product tire. Consequently, the boundary portion is also formed between the block 24 and the ridges 38a, 38b. By this, non-vulcanized tread rubber can be sufficiently filled up to the portion of the mold corresponding to the edge of the land portion of the product tire. On this occasion, there may be instances where burrs are formed due to possible extrusion of rubber through the boundary portion. However, the resultant burrs extend in parallel with a plane including the tread region of the product tire and protrude toward inside of the groove of the product tire. Thus, such burrs are less influential on the appearance of the product tire, as compared with the burrs which are formed by conventional mold to protrude radially outwardly from the tread region of the tire.

Further, in the curing mold according to the present invention, the connecting surface of each fitting piece is an opposing surface portion at the fixing portion of mutually adjacent fitting pieces so that only these surface portions require machining as the connecting surface. This is particularly advantageous in that the production of the mold can be facilitated and the accuracy of the mold can be readily improved, in contrast to the conventional one wherein machining must be carried out with respect to the connecting surface of each fitting piece substantially over the entire circumference, as shown in FIG. 4 by the broken line.

In another embodiment according to the present invention, the fitting piece 26 is made of a material with a thermal expansion coefficient which is higher than that of the material forming the block 24 to which these fitting pieces 26 are attached. Owing to such a construction, during the vulcanization of the green tire, the fitting piece 26 undergoes an expansion relative to the block 24, with the both ends of the fitting piece 26 restrained by the fixing portions with respect to the block 24. Further, the fitting piece 26 has a curvature with a center of curvature positioned inward of the mold. Thus, the projection 40 is curved during the vulcanization of the green tire, making the side opposing to the block 24 to be outside. In other words, the projection 40 is tightly urged against the block 24 so that the projection 40 is effectively prevented from separation from the inner surface of the mold during the vulcanization, as was the case in the prior art curing mold.

It will be readily appreciated that the curing mold according to the present invention can be produced in the following manner:

First of all, the fitting pieces 26 are prepared each having an inner circumferential surface which is complementary to a part of the groove portion of the tread portion of the product tire, so that the outer surface of the green tire can be brought into a pressure contact during the vulcanization. The fitting piece 26 is formed with the fixing portions on both ends thereof, so that at least one of the fixing portions is complementary to a part of the land portion in at least the tread region of the product tire. On the other hand, the block 24 for integrally supporting these fitting pieces 26 are prepared each having an inner circumferential surface which is complementary to the tread region of the product tire, and further having the fitting grooves in which the fixing portions of the fitting piece 26 can be engaged. Then, each fitting piece 26 is mutually adjoined with each other, with the fixing portions thereof engaged into the fitting grooves of the block 24, so as to provide a segment 22 of the curing mold.

For examining the superiority of the present invention, green tires were vulcanized and molded using the curing mold according to the present invention and a prior art mold of the insert segment type. Comparisons were made with reference to the length of the boundary portion effective for discharge of air from the mold ($L_1$), the length of the boundary portion appearing in the tread region of the product tire ($L_2$), the machining hour required for machining the fitting piece connecting surface, and the out-of-roundness of the ground contacting portion of the product tire. The results of the comparisons are shown in the following table with indices which are 100 for each item of the insert segment type. Except for the length $L_1$ of the boundary portion, smaller indices represent improvement achieved by the present invention.

TABLE

| | The invention | Prior Art |
|---|---|---|
| Length of boundary portion ($L_1$) | 250 | 100 |
| Length of boundary portion ($L_2$) | 30 | 100 |
| Machining hour | 50 | 100 |
| Out-of-roundness | 50 | 100 |

The foregoing table clearly shows that, in accordance with the present invention, the effective length $L_1$ of the boundary portion for the discharge of air from the inside of the curing mold can be increased by two and half times, the length $L_2$ of the boundary portion appearing in the tread region of the product tire can be reduced by about one third, the machining hour required for the fitting piece can be reduced by one half, and the out-of-roundness can be reduced by one half.

Thus, the present invention serves to realize an improved curing mold which provides an excellent appearance and improved uniformity and accuracy of the product tires, which facilitates the manufacture and maintenance of the mold, and which is easy to respond to changes in tire design.

The present invention is not limited to the abovementioned embodiments, and various modifications may be made without departing from the scope of claims.

For example, each projection may be provided with the fixing portions on both ends, or common fixing portions may be provided for a plurality of spaced projections on their both ends, or a common fixing portion may be provided for a plurality of spaced projections on their intermediate regions.

What is claimed is:

1. A method of manufacturing a curing mold for pneumatic tires, comprising a plurality of segments which are detachably aligned with each other in a direction of the mold corresponding to a circumferential direction of a product tire, each segment having an inner circumferential surface portion which is complementary in shape to land and groove portions in a tread region of the tire, wherein said method comprises the steps of:

preparing a plurality of fitting pieces, each having a projection which is complementary in shape to part of said groove portion of the tire and fixing portions at both ends of the projection at least one of which is complementary in shape to part of said land portion of the tire;

preparing a supporting block having fitting grooves corresponding to the fixing portions of the fitting pieces in that side of the supporting block which forms part of said inner circumferential surface portion of the mold; and successively securing the fitting pieces to the supporting block by engaging the fixing portions of the fitting pieces into the fitting grooves of the supporting block, so as to form said segment.

2. A curing mold for pneumatic tires, comprising a plurality of segments which are detachably aligned with each other in a direction of the mold corresponding to a circumferential direction of a product tire, each segment having an inner circumferential surface portion which is complementary in shape to land and groove portions in a tread region of the tire, said segments each comprising a plurality of fitting pieces and a supporting block for supporting the fitting pieces so as to form a part of said inner circumferential surface portion, said fitting pieces each comprising a projection which is complementary in shape to part of said groove portion, with both ends of each fitting piece being fixing portions at said inner circumferential surface portion of said segment, for fixedly securing the fitting piece to the supporting block, at least one of said fixing portions being complementary in shape to part of said land portion, said supporting block each having fitting grooves corresponding to the fixing portions of said fitting pieces, the fixing portions of each fitting piece being engaged in the fitting grooves of the block.

3. The curing mold as set forth in claim 2, wherein each fitting piece is formed of a material having a thermal expansion coefficient which is higher than that of a material forming the supporting block.

4. The curing mold of claim 2, wherein said fitting grooves in said supporting block comprises a first fitting groove having a sidewall on a side of a tread center region of said product tire and a second fitting groove having an opposed sidewall in a sidewall region of said product tire.

5. The curing mold of claim 1 comprising the step of positioning said fitting pieces onto said supporting block by circumferential movement from an end of said supporting block into position in said fitting grooves to prevent radial movement of a fitting piece already engaged into said fitting grooves.

* * * * *